United States Patent
Han (10) Patent No.: US 6,675,762 B2
(45) Date of Patent: Jan. 13, 2004

(54) PISTON ASSEMBLY HAVING COUNTERFLOW THWARTING CONSTRUCTION FOR USE IN AN INTERNAL COMBUSTION ENGINE

(75) Inventor: Geum Tai Han, Daejeonsi (KR)

(73) Assignee: Samyung Machinery Co., Ltd. (KR)

( * ) Notice: Subject to any disclaimer, the term of this patent is extended or adjusted under 35 U.S.C. 154(b) by 0 days.

(21) Appl. No.: 10/084,142

(22) Filed: Feb. 28, 2002

(65) Prior Publication Data

US 2003/0079709 A1 May 1, 2003

(30) Foreign Application Priority Data

Oct. 30, 2001 (KR) ................. 10-2001-0067251

(51) Int. Cl.$^7$ .................................. F16J 1/04
(52) U.S. Cl. .................................. 123/193.6
(58) Field of Search ............... 123/193.6; 92/208; 277/310, 311

(56) References Cited

U.S. PATENT DOCUMENTS

| | | | |
|---|---|---|---|
| 3,667,443 A | * | 6/1972 | Currie et al. ............ 123/193.6 |
| 4,669,369 A | * | 6/1987 | Holt et al. ............... 123/193.6 |
| 5,477,821 A | * | 12/1995 | Chapple .................. 123/193.6 |
| 5,655,433 A | * | 8/1997 | Santi ....................... 123/193.6 |

* cited by examiner

Primary Examiner—Marguerite McMahon
(74) Attorney, Agent, or Firm—Edell, Shapiro & Finnan, LLC (57) ABSTRACT

A one piece piston for use in an internal combustion engine provided with a plurality of compression rings and oil rings on its circumferential surface includes ring grooves having a hole communicating with an inside of the piston, oil rings received in the ring grooves, respectively; and a keeping ring mounted between the oil rings and having on its internal surface a spring receiving groove whose inner diameter is larger than an outer diameter of a ring type spring, wherein a separation between an external surface of the ring groove and the internal surface of the keeping ring is maintained equal to that of the compression ring and a hole is formed to allow the ring groove to communicate with the inside of the piston.

3 Claims, 7 Drawing Sheets

PISTON ASSEMBLY HAVING COUNTERFLOW THWARTING CONSTRUCTION FOR USE IN AN INTERNAL COMBUSTION ENGINE

BACKGROUND OF THE INVENTION (a) Field of the Invention

The present invention relates to a piston in an internal combustion engine for use with an diesel engine, and more particularly, to a piston assembly for use in an internal combustion engine, having a counter-flow thwarting construction therewith, whereby an unwanted combustion of an engine oil together with a fuel, which may occur when the engine oil is introduced into a combustion chamber by an inner pressure being instantaneously generated in the piston moving down during its ordinary reciprocating movements, can be prevented, resulting that an excessive consumption of the lubricant, smoke caused by incomplete combustion and reduction of power can be avoided.

(b) Description of the Related Art

In general, a piston in an internal combustion engine reciprocates within a cylinder, wherein a suction stroke, a compression stroke, an explosion stroke and an exhaust stroke occur generating a power. In order to increase the power, various efforts such as an endeavor to remove the factors that would reduce the power have been attempted.

The power-reducing factors are, e.g., an incomplete combustion occurring when an engine oil is introduced into a combustion chamber to be burnt together with the fuel, an inferiority of an injection nozzle tip, a shortage of the amount of the suction air and a poor air-tight property of the piston ring.

Studies have found that the incomplete combustion caused by the engine oil results in a mass of carbon or soot adhering to a crown of the piston or an external surface of the piston, especially, that a reverse flow of the engine oil or air into the combustion chamber of the cylinder or an introduction of the fuel into an inside of the piston is caused by an internal pressure generated within the chamber near a crank during the reciprocating movement of the piston.

Hereunder, this phenomenon will be described in detail with reference to the accompanying drawings.

Figure 1A:
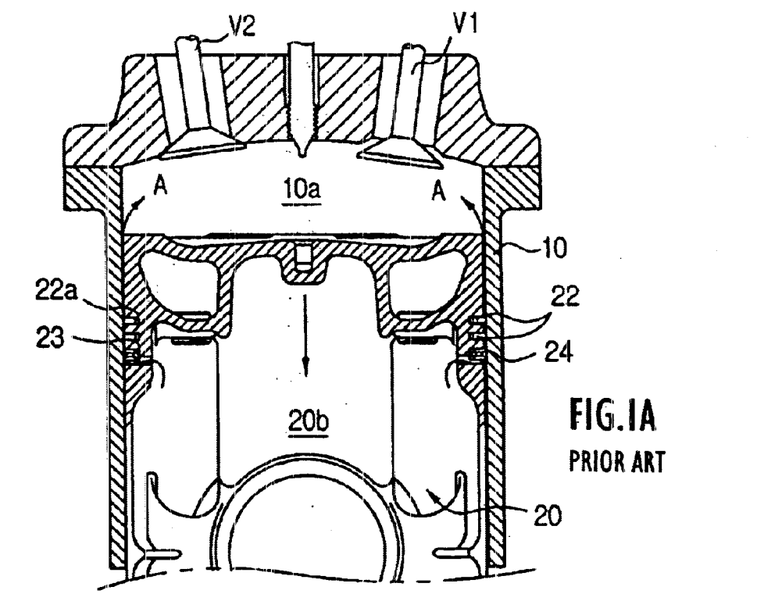
FIGS. 1a to 1d show sectional views of a stroke of a piston in a conventional internal combustion engine.

FIG. 1a presents a suction stroke of a cylinder where a piston 20 moves down from a top dead point to a bottom dead point and a suction valve V1 is opened simultaneously, introducing air and fuel into a combustion chamber 10a.

Figure 1B:
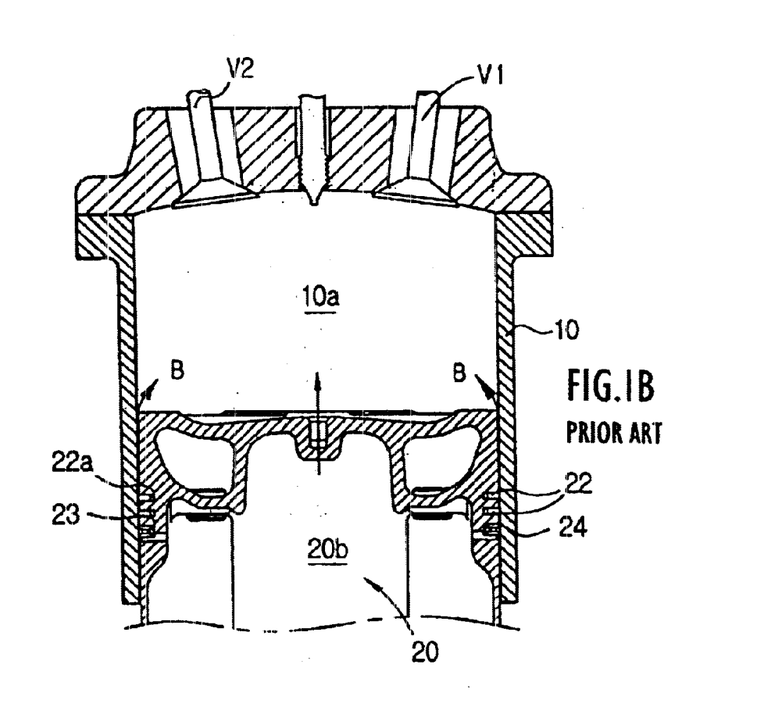

FIG. 1b represents a compression stroke of the cylinder where the piston moves up from the bottom dead point and the suction valve V1 is closed simultaneously, thereby compressing the air and fuel in high temperature and high pressure.

Figure 1C:
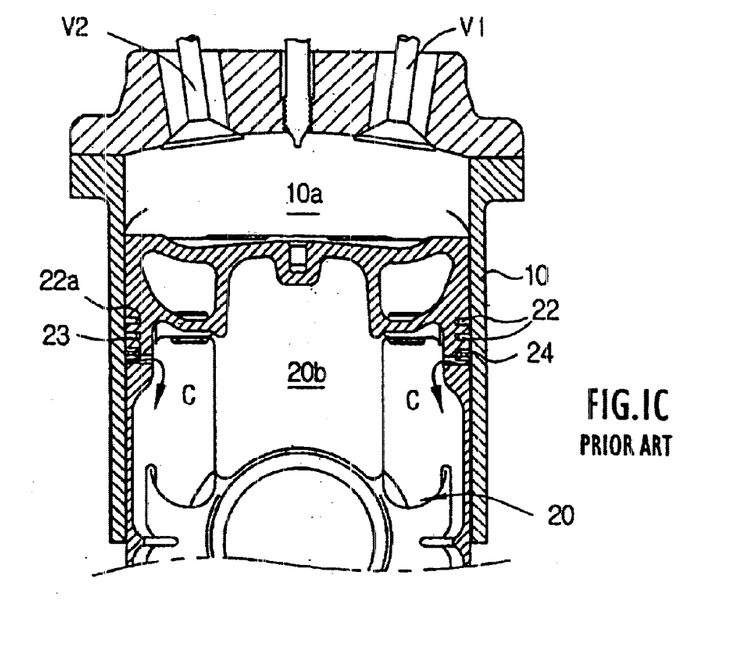
Figure 1D:
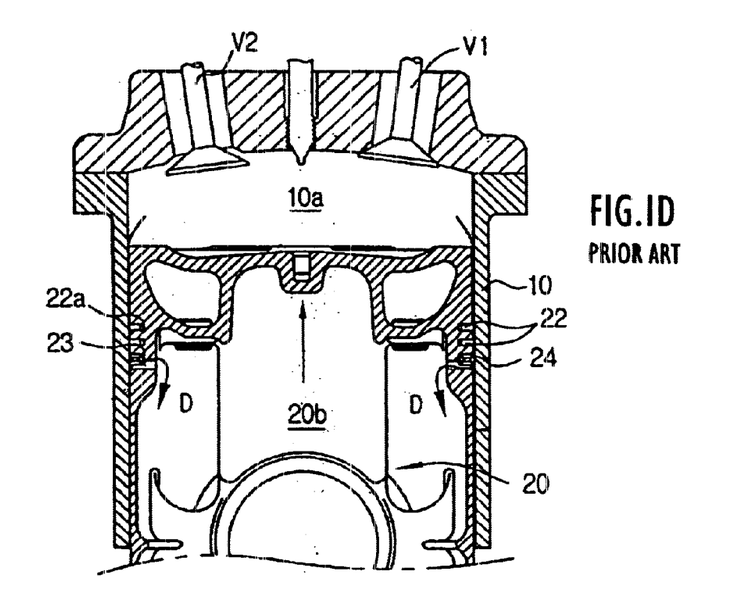

FIG. 1c represents an explosion stroke where the fuel compressed in the high temperature and pressure condition is exploded to be burnt when the piston 20 reaches the top dead point; and FIG. 1d represents an exhaust stroke where an exhaust valve V2 is opened and the piston moves up to the top dead point, resulting that the combustion gas is exhausted out of the combustion chamber 10a.

As shown in FIGS. 1a to 1d, the piston reciprocating within the cylinder 10 has a plurality of ring grooves 22a, 23, wherein a compression ring 22 and an oil ring 24 are mounted in the ring groove 22a.

Accordingly, during the reciprocating movements of the piston, the compression ring 22 presses against the internal surface of the cylinder to generate a surface pressure therebetween, providing a pressing pressure in the combustion chamber 10a. The oil ring 24 functions to scratch the engine oil off the cylinder.

In the suction stroke (shown in FIG. 1a) where the piston 20 moves down from a top dead point to a bottom dead point and a suction valve V1 is opened simultaneously, generating a vacuum state in the combustion chamber 10a, a pressure within the piston 20 is sharply increased. For this reason, a reversed flow of air is introduced in a direction indicated with an arrow A in an oil passageway, thereby allowing oil sticking to or remaining on the oil ring 24 and the ring groove 23 to be introduced into the combustion chamber along an internal surface of the cylinder liner.

The oil conversely flown into the combustion chamber sticks to the internal wall of the cylinder liner in a large amount and is further introduced into the combustion chamber in the compression stroke, in a direction indicated with an arrow B, during which the piston 20 moving up scratches up the oil sticking to the internal wall of the cylinder liner. The engine oil introduced into the combustion chamber having a higher level of flash point would hinder the combustion in the explosion stroke (see FIG. 1c), causing the incomplete combustion and would emit smoke in the exhaust stroke (see FIG. 1d).

In the operation of the four cycle engine, since the internal pressure of the piston becomes lower sharply during the exhaust stroke (see FIG. 1d) where the exhaust valve V2 is opened and the piston moves up toward the top dead point, the combustion gas in the combustion chamber 10a is introduced into the cylinder 20 and the inside of the piston 20 through a gap between the internal wall of the cylinder 10 and the external surface of the piston 20, a gap between the compression ring 22 and the cylinder liner, and the ring groove 23 and a hole 26, in a direction indicated with an arrow of D. This phenomenon also occurs during the explosion stroke (see FIG. 1c), in which the air flows in a direction indicated with an arrow C. The cause of this problem mainly resides on the oil ring and the space between the ring grooves through which the exhaust and the suction occur.

More detailed description of this will be made with reference to FIGS. 2a and 2b.

Figure 2A:
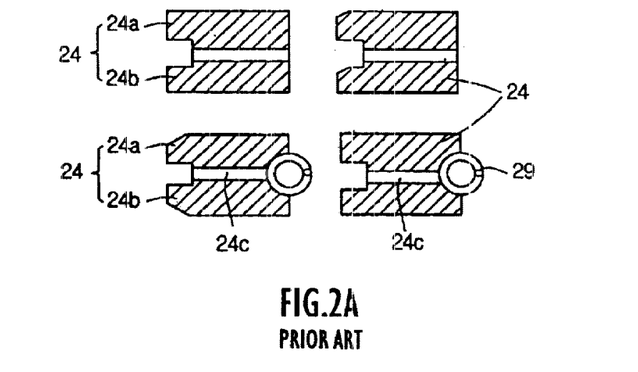
FIG. 2a illustrates a sectional view showing kinds of the conventional pistons as examples.
Figure 2B:
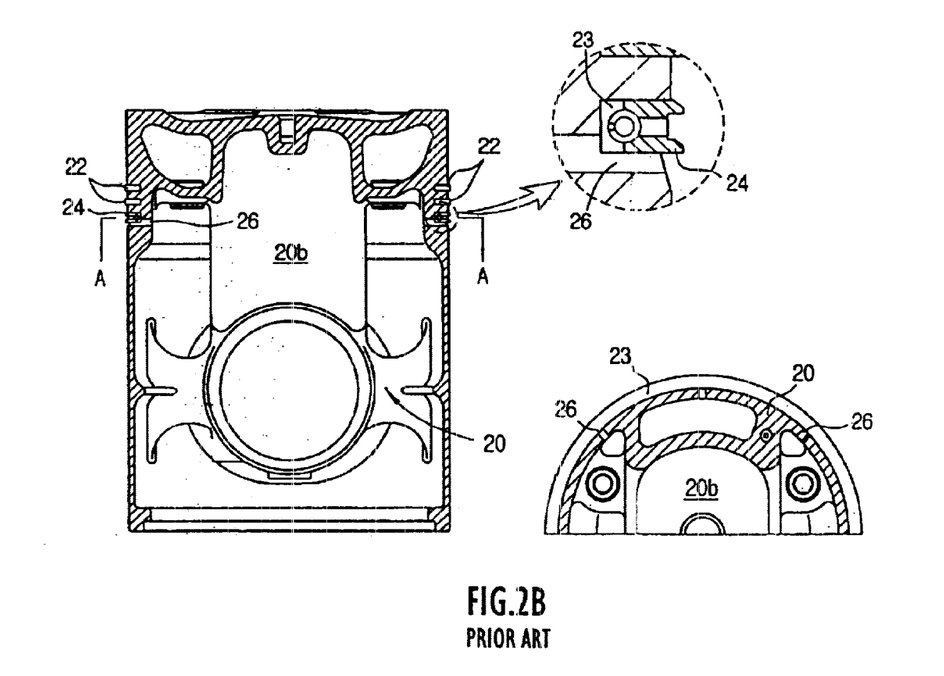
FIG. 2b depicts a sectional view showing an oil ring equipped in a one-piece piston.
Figure 2C:
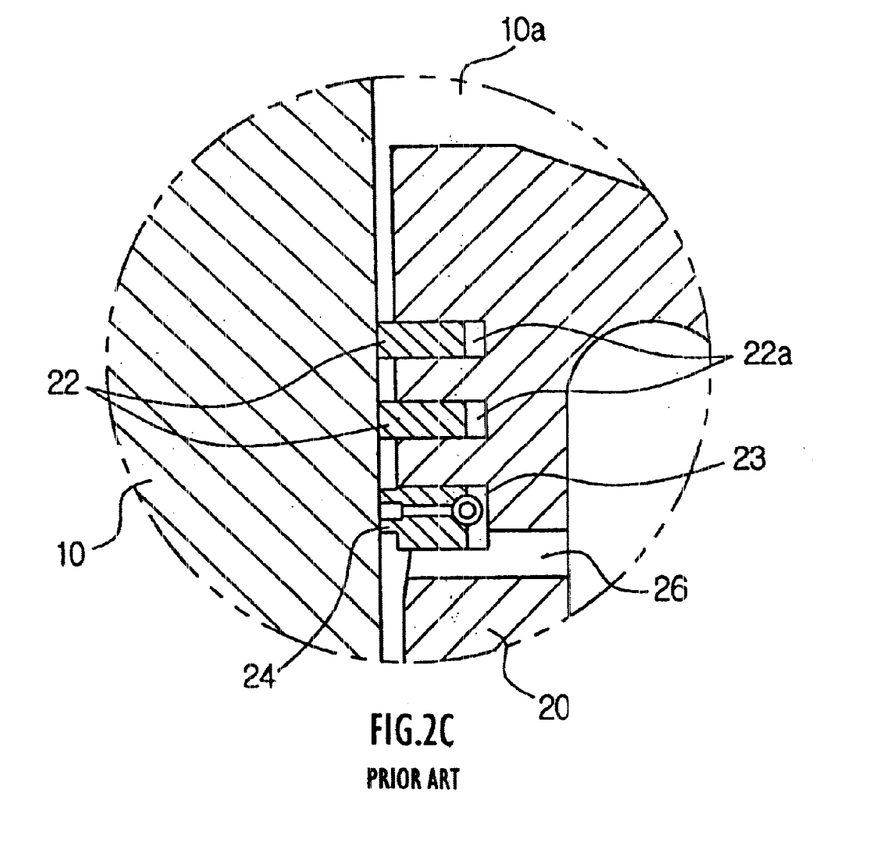
FIG. 2c gives a partial sectional view of FIG. 2a, when taken along a line A—A.

FIG. 2a shows the kinds of the oil rings which may be mounted around the piston; and FIG. 2b represents a sectional view of a state of the oil ring mounted on a one piece piston, while FIG. 2c being an enlarged sectional view of the oil ring shown in FIG. 2b.

As shown in FIG. 2a, the oil ring has through-holes 24c formed through a center of the oil ring 24 and a pair of protrusions 24a and 24b protruding along a circumferential direction on an external surface of the oil ring 24 and being separated from each other. The protrusions serve to scratch the engine oil adhering to the internal wall of the cylinder liner during the reciprocating movements of the piston. The lower protrusion 24b firstly scratches down the oil adhering to the internal wall of the cylinder liner, while the upper protrusion 24a further scratches down the oil remaining thereon, providing a dual performance in scratching the oil.

As shown in FIG. 2b, the oil scratched down by the oil ring 24 is introduced into the through-hole 24c to flow into the inside 20b of the piston via the hole 26 communicating with the inside 20b of the piston.

As shown in FIGS. 2a through 2c, the oil ring 24 may have a ring-shaped spring 29 mounted therein. However, the ring-shaped spring 29 equipped in the oil ring makes a space between the oil ring and the ring groove 23. Accordingly, a certain amount of oil will be kept within the ring groove 23.

That is, during the reciprocating movements of the piston as shown in FIGS. 1a through 1d, especially, when the piston moves down from the top dead point to the bottom dead point, the internal pressure is instantaneously generated in the piston due to the inertia of the air within the piston and then the oil remaining in the ring groove and the oil sticking to the internal wall of the cylinder liner are drawn to flow conversely into the combustion chamber 10a, going against the oil ring 24 along the internal wall of the piston liner.

In this regard, developments for an oil ring capable of providing a strong air-tight condition between the oil ring 24 and the ring groove 23, thereby reducing the communication between both sides of the oil ring and efficiently removing the oil adhering to the internal wall of the cylinder liner has been requested. Particularly, in case of the one-piece piston, since it is made by using casting, being accompanied by a lot of limitations, the development of the oil ring capable of providing the strong air-tight is needed strongly. That is, the oil-air keeping ring insulating the air from the oil and being capable of efficiently removing the oil is necessary.

Further, since a dividable piston made in such a manner that an upper portion of the piston is firstly made of a heat-resistant material and then it is assembled with a piston body may be employed as a piston of the internal combustion engine, an oil ring fit for the dividable piston or a piston having a reverse-flow thwarting construction has been requested.

SUMMARY OF THE INVENTION

It is an object of the present invention to provide a one piece piston assembly for use in an internal combustion engine, having an oil ring fit for a one piece piston, an oil discharge construction and a reverse-flow thwarting construction, in order to prevent a reverse flow of the oil.

Another object of the present invention is to provide a dividable piston having an enhanced reverse flow thwarting construction in order to prevent a reverse flow of the oil or a reverse flow of fuel in the combustion chamber or combustion gas into the engine oil.

To achieve the above and other objects, the present invention provides a one piece piston for use in an internal combustion engine provided with a plurality of compression rings and oil rings on its circumferential surface includes ring grooves having a hole communicating with an inside of the piston, oil rings received in the ring grooves, respectively; and a keeping ring mounted between the oil rings and having on its internal surface a spring receiving groove whose inner diameter is larger than an outer diameter of a ring type spring, wherein a separation between an external surface of the ring groove and the internal surface of the keeping ring is maintained equal to that of the compression ring and a hole is formed to allow the ring groove to communicate with the inside of the piston.

The keeping ring has a shape similar to a taper under cut type compression ring, in which a spring receiving groove having a diameter larger than the diameter of the ring type spring is formed on an inner peripheral surface, the ring type spring being received in the spring receiving groove.

The keeping ring is provided with on its upper and lower sides a pair of protrusions, respectively, and through holes separated from one another in a predetermined distance along a circumferential direction on an external surface of the keeping ring, the keeping ring having on its inner peripheral surface a spring receiving groove in which said ring type spring is received.

In accordance with the present invention, there is provided a dividable piston for use in an internal combustion engine having a crown whose upper side is made of heat resisting material, and a piston body provided with a plurality of compression rings and oil rings on its circumferential surface, the piston characterized in that: a hole is formed through a lower circumferential surface of the crown to allowing a ring groove into which said oil ring is inserted to communicate with an internal surface of the crown, wherein oil introduced into the ring groove by the oil ring is drained along an oil passageway via the hole; and a semi-circular protrusion is symmetrically made by partially cutting portions near a pin hole and an oil passageway communicating with the holes is formed through a body of the piston, the oil passageway also communicating with a plurality of holes formed radially inwardly from the upper peripheral surface of the piston body and a drain hole positioned vertically.

The oil ring is provided with on its upper and lower sides a pair of protrusions, respectively, and through holes separated from one another in a predetermined distance along a circumferential direction on an external surface of the oil ring, the keeping ring having on its inner peripheral surface a spring receiving groove in which said ring type spring is received.

The oil ring is provided with a spring receiving groove having a diameter larger than the diameter of the ring type spring is formed on an inner peripheral surface, the ring type spring being received in the spring receiving groove.

A keeping ring may be mounted between the compression ring and the oil ring of the crown.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 4a is an enlarged sectional view of principal parts of FIG. 3a;

DETAILED DESCRIPTION OF THE PREFERRED EMBODIMENTS

A preferred embodiment of a piston assembly for use in an internal combustion engine having a reverse flow-thwarting construction in accordance with one embodiment of the present invention will hereinafter be described in detail with reference to the accompanying drawings.

Figure 3A:
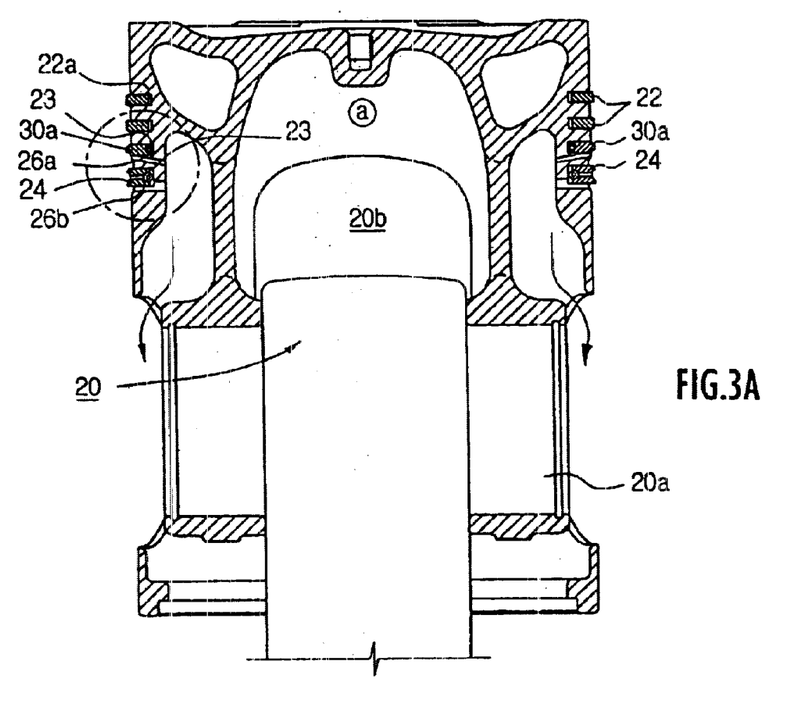
FIG. 3a presents a sectional view of an inventive one-piece type piston having a counter-flow thwarting construction therewith.
Figure 3B:
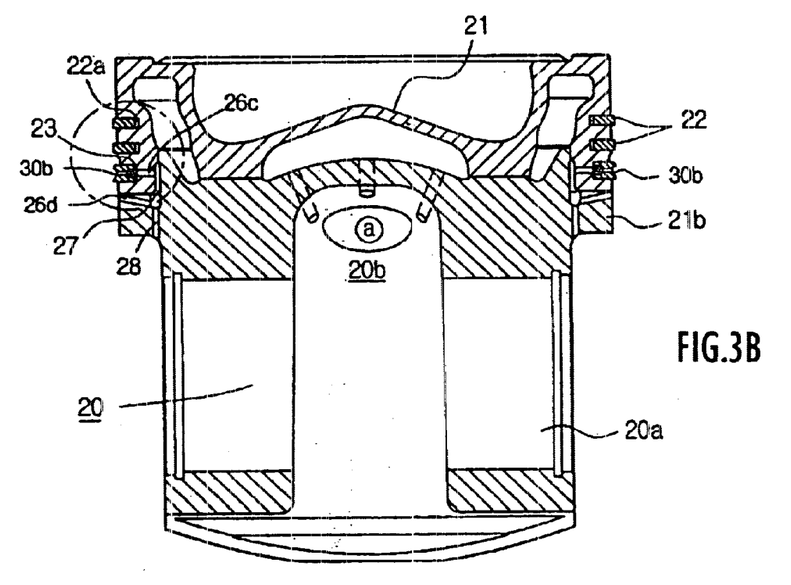
FIG. 3b represents a sectional view of an inventive dividable piston having a counter-flow thwarting construction therewith.

FIG. 3a presents a sectional view of an inventive one-piece type piston having a counter-flow thwarting construction therewith; and FIG. 3b represents a sectional view of an inventive dividable piston having a counter-flow thwarting construction therewith. Here, the same components as those of the prior art will be represented with identical referential numerals.

A description of a one-piece piston for use in the internal combustion engine having the reverse flow-thwarting construction is made hereunder.

In FIG. 3a, the referential numeral 20 represents a piston, and the referential numeral 20a means a hole for a piston pin rotatably connecting the piston with a crank rod, while the referential numeral 20b indicating an inside of the piston.

As shown, the piston 20 has a compression ring 22 positioned around its upper portion and a keeping ring 30a kept below the compression ring 22.

Figure 5A:
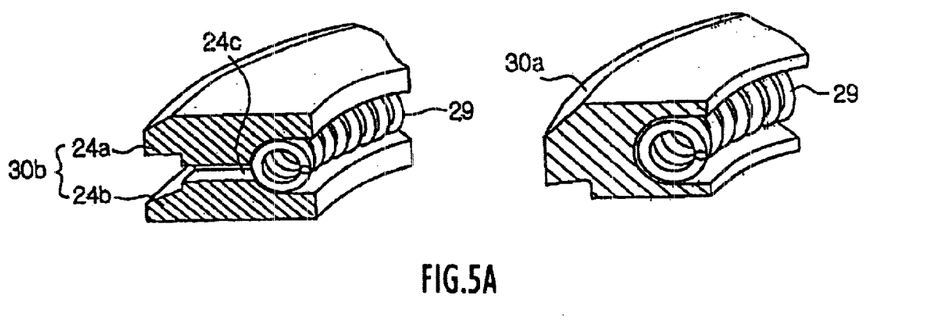
FIGS. 5a and 5b show sectional views of exemplary oil ring and keeping ring employed in the inventive piston, respectively.
Figure 5B:
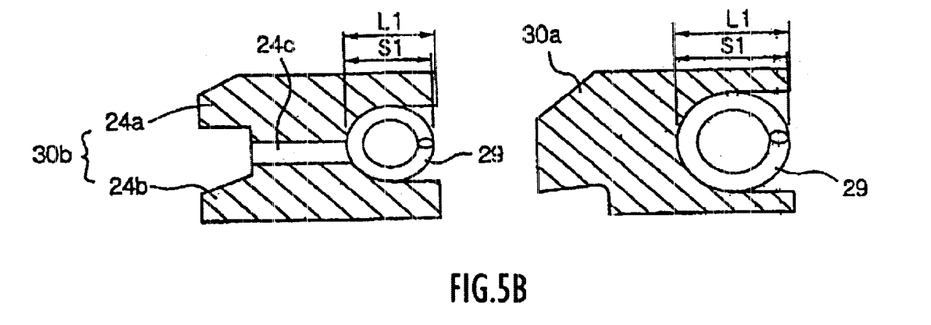

As shown in right-hand drawings of FIGS. 5a and 5b, the keeping ring 30a appears similar to a taper under cut type compression ring, in which a spring receiving groove L1 having an inner peripheral surface onto which a ring type spring 29 is inserted is provided.

As described above, the spring receiving groove L1 is a groove in which the ring type spring 29 is inserted to exert its tensioning force. As shown in FIG. 2a, the spring receiving groove L1 appears such that a conventional scraper type compression ring has on its inner peripheral surface a coil spring inserted thereon, as similar to the oil ring 24. However, its depth is at least equal to or greater than a diameter S1 of the spring 29. This is because it is required that the keeping ring 30a have an enlarged contact surface, when being assembled into the ring groove 23. When the ring type spring 29 exerts a higher tensioning force in a circumferential direction of the keeping ring 30a, the latter is resiliently kept on an external surface of the cylinder liner in a closer contact thereto.

One of the keeping rings 30a and 30b shown in FIG. 5a may be properly employed to fit with a particular application.

In the inventive one-piece piston, since the ring type coil spring 29 is received in the inner peripheral surface of the keeping ring 30a, i.e., into the spring receiving groove L1, the contact surface between the keeping ring 30a and the ring groove 23 into which the keeping ring 30a is inserted becomes larger. That is, since the contact surface becomes large, the influence by the internal pressure generated within a combustion chamber or the piston 20 during the reciprocating movements of the piston can be shut-off in a great level.

The internal pressure in the inside 20b of the piston occurring when the movement of the piston is converted has its largest value in a region indicated with "a", as shown in FIG. 3a. However, it is difficult for the internal pressure in the inside 20b of the piston to be exerted beyond a region defined by the keeping ring 30a, which may be exerted via the holes 26a and 26b, since the contact surface between the ring groove 23 and the keeping ring 30a and a more closer contact between the surface of the cylinder liner and the keeping ring 30a caused by the tensioning force by the coil spring.

In this configuration, the lower oil ring 24 and the upper keeping ring 30a moves down in the close contact relationship with the internal wall of the cylinder liner, scratching the oil adhering to the internal wall, during the reciprocating movement of the piston. The oil collected by the both rings promptly flows down into the inside 20b of the piston via the holes 26a and 26b.

The configuration and the operation of the inventive dividable piston having the reverse flow thwarting construction will be explained.

Figure 4A:
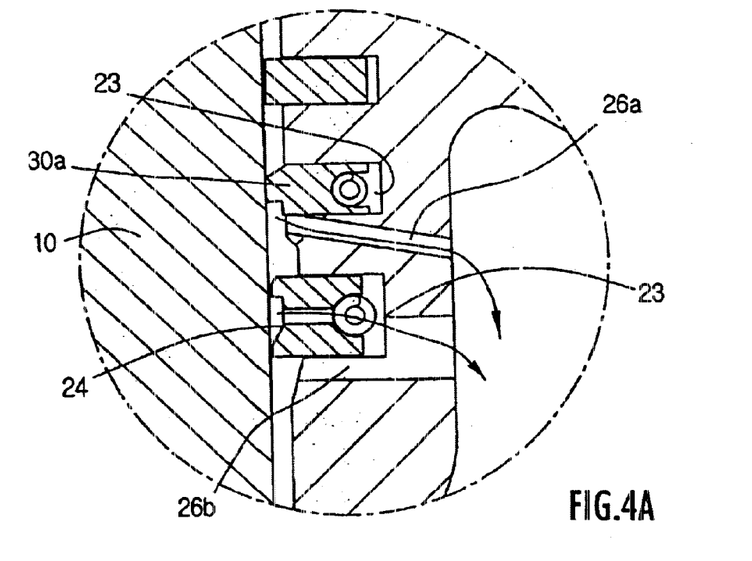
Figure 4B:
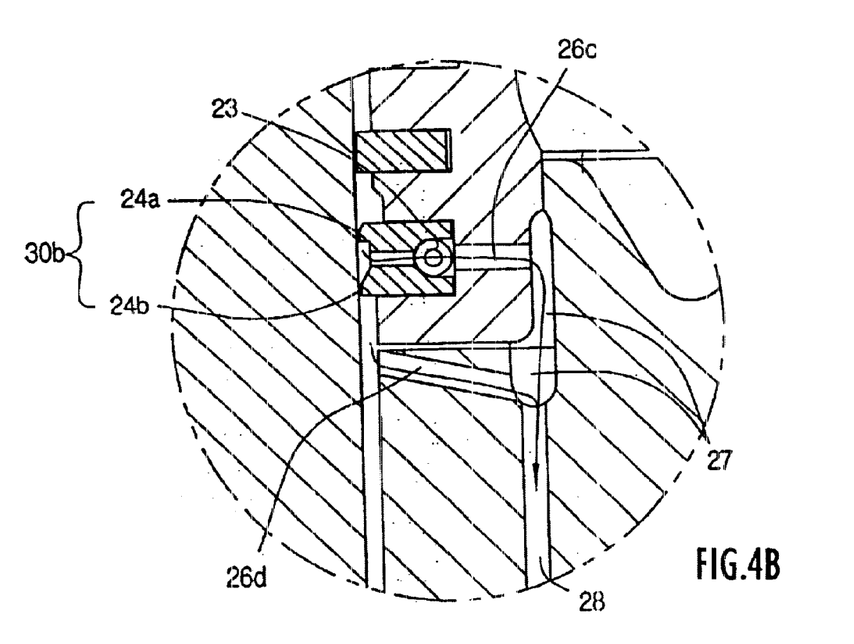
FIG. 4b sets forth an enlarged sectional view of principal parts of FIG. 3b.

As shown in FIGS. 3b and 4b, the compression ring 22 is provided on a circumferential surface of a crown 21 and a keeping ring 30b is received in the ring groove 23. A hole 26c is formed through to communicate with an internal surface of the crown 21.

An oil passageway 27 taking up a predetermined space within the inside of the crown 21 and communicating with the holes 26c is formed through a body of the piston being assembled with the crown 21, being superposed thereon. The oil passageway 27 is positioned circumferentially of the body of the piston being assembled with the crown 21, being superposed thereon.

The oil passageway 27 also communicates with a plurality of holes 26d formed radially inwardly from the upper peripheral surface of the body of the piston 20 and communicates with a drain hole 28 in a vertical position.

The oil passageway 27 is circumferentially formed on the upper portion of the body of the piston. Particularly, the oil passageway 27 is formed in a protrusion 21b of a semi-circular shape which is formed by partially cutting a circumferential portion of the piston at a predetermined height from a lower skirt of the body of the piston 20, wherein the oil passageway 27 communicates with a bottom of the protrusion 21b of the semi-circular shape via the drain hole 28.

The oil passageway 27 serves to prevent the direct exertion of the internal pressure in the inside 20b of the piston through its space and to cushion a pressure in a space below the semi-circular protrusion 21b which has its relatively lower value, thereby reducing the reverse flow of the oil.

In the conventional piston as shown in FIGS. 1a to 1d, the internal pressure generating in the inside 20b of the piston is exerted via the oil hole 26 of the oil ring groove communicating with the upper portion of the inside of the piston, between the oil ring 24 and its ring groove 23, allowing the oil to contrarily flow into the combustion chamber 10a. However, as shown in FIG. 3b, in the present invention, the oil passageway 27 and the holes 26c and 26d prevent the direct exertion of the internal pressure within the inside 20b of the piston. Further, the oil collected by the scratching is drained to the drain hole 28 via the hole 26c and the oil passageway 27 formed between the crown and the piston body, thereby preventing the internal pressure in the piston from exerting through the hole of the oil ring groove.

Further, in order to obtain a more powerful control of the reverse flow of the oil, the oil ring may be changed to a configuration of the keeping ring 30b, thereby having an enlarged contact surface area with the ring groove 23.

In other words, since both principal surfaces of the keeping ring 30b are contacted to the ring groove 23 over a large area, the keeping ring 30b can efficiently prevent the exertion of the internal pressure in the piston.

Furthermore, the oil scratched down by the lower protrusion 24 of the keeping ring 30b flows into the oil passageway 27 along the inclined hole 26d, whereas the oil collected by the upper protrusion 24a is introduced into the oil passageway 27 via the hole 26c.

Accordingly, the engine oil introduced into the oil passageway 27 flows downwardly of the semi-circular protrusion 21b via the drain hole 28.

In the piston assembly, especially, the one piece piston, in the internal combustion engine having the reverse flow thwarting construction in accordance with the present invention, the keeping ring 30 is mounted between the oil ring 24 and the compression ring 22 and has the large contact surface area with the ring groove 23 and a highly close contact relationship with the cylinder liner due to a great level of the tensioning force, thereby preventing the reverse flow of the oil into the combustion chamber due to the internal pressure within the piston during the reciprocating movements of the piston and preventing the direct exertion of the compression pressure and the explosion pressure during the compression stroke and the explosion stroke onto the inside of the piston.

Moreover, in case of the dividable piston, the oil passageway 27 and the holes 26c and 26d can prevent the direct exertion of the internal pressure generated in the piston by its space and cushion the exertion of the internal pressure in the space below the semi-circular protrusion 21b having the relatively lower value toward the combustion chamber. Here, the keeping ring 30b has a large contact surface area with the ring groove 23, thereby preventing the internal pressure from exerting via a gap between the keeping ring 30b and the ring groove 23. The scratched oil is drained via the holes 26c and 26d to the drain hole 28.

Accordingly, the engine oil or the air is not introduced into the inside of the cylinder of the internal combustion engine and the fuel is not introduced into the inside of the piston, thereby reducing the over-consumption of the lubricant and the emission of the smoke caused by the incomplete combustion and increasing the life-time of the engine.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A one piece piston for use in an internal combustion engine provided with at least one compression ring and oil ring on a circumferential surface, the piston comprising:

a plurality of ring grooves, at least one ring groove having a hole communicating with an inside of the piston;

the at least one oil ring received in one of the plurality of ring grooves, respectively; and a keeping ring mounted between the oil ring and the compression ring, the keeping ring having a spring receiving groove on an internal surface, the spring receiving groove having an inner diameter larger than an outer diameter of a ring type spring, wherein a separation between an internal surface of the ring groove and the internal surface of the keeping ring is maintained equal to a distance between the oil ring and the hole provided in one of the ring grooves such that the ring groove communicates with the inside of the piston.

2. The one piece piston of claim 1, wherein the keeping ring has a shape similar to a taper under cut type compression ring, the spring receiving groove has a diameter larger than a diameter of the ring type spring, the ring type spring being received in an inner peripheral surface of the spring receiving groove.

3. The one piece piston of claim 1, wherein the keeping ring has a pair of protrusions on upper and lower sides and through holes separated from each other at a predetermined distance along a circumferential direction on an external surface of the keeping ring, the keeping ring having the spring receiving groove on an inner peripheral surface, the spring receiving groove adapted to receive the ring type spring.

* * * * *